US010783279B2

(12) United States Patent
Pedersen et al.

(10) Patent No.: US 10,783,279 B2
(45) Date of Patent: Sep. 22, 2020

(54) LOW COST CRYPTOGRAPHIC ACCELERATOR

(71) Applicant: Atmel Corporation, San Jose, CA (US)

(72) Inventors: Frode Milch Pedersen, Trondheim (NO); Martin Olsson, Saupstad (NO); Arne Aas, Trondheim (NO)

(73) Assignee: Atmel Corporation, Chandler, AZ (US)

( * ) Notice: Subject to any disclaimer, the term of this patent is extended or adjusted under 35 U.S.C. 154(b) by 99 days.

(21) Appl. No.: 15/679,134

(22) Filed: Aug. 16, 2017

(65) Prior Publication Data

US 2018/0089467 A1 Mar. 29, 2018

Related U.S. Application Data

(60) Provisional application No. 62/382,703, filed on Sep. 1, 2016.

(51) Int. Cl.
*G06F 21/72* (2013.01)
*H04L 9/06* (2006.01)

(52) U.S. Cl.
CPC .............. *G06F 21/72* (2013.01); *H04L 9/06* (2013.01); *H04L 9/0631* (2013.01); *H04L 9/0643* (2013.01); *H04L 2209/12* (2013.01)

(58) Field of Classification Search
CPC ......... G06F 21/72; H04L 9/06; H04L 9/0631; H04L 9/0643; H04L 2209/12
USPC ......................................................... 713/189
See application file for complete search history.

(56) References Cited

U.S. PATENT DOCUMENTS

| | | | | |
|---|---|---|---|---|
| 7,082,477 B1* | 7/2006 | Sadhasivam | ........ | H04L 63/0428 370/392 |
| 7,376,826 B2* | 5/2008 | Tardo | ........ | H04L 9/3226 380/225 |
| 7,543,158 B2* | 6/2009 | Goss | ........ | G06F 21/72 380/29 |
| 8,091,125 B1* | 1/2012 | Hughes | ........ | G06F 9/4843 380/30 |
| 10,212,138 B1* | 2/2019 | Diamant | ........ | H04L 63/0428 |

(Continued)

*Primary Examiner* — David J Pearson
*Assistant Examiner* — Badri Champakesan
(74) *Attorney, Agent, or Firm* — TraskBritt

(57) ABSTRACT

A low-cost cryptographic accelerator is disclosed that accelerates inner loops of a cryptographic process. The cryptographic accelerator performs operations on cryptographic data provided by a central processing unit (CPU) running a software cryptographic process to create a combined hardware and software cryptographic process, resulting in a lower cost secure communication solution than software-only or hardware-only cryptographic processes. In an embodiment, a cryptographic accelerator comprises: an interface configured to receive cryptographic data, the cryptographic data indicating a particular cryptographic process to be performed on the cryptographic data; transformation logic configured to perform a cryptographic operation on the cryptographic data according to the cryptographic process, the transformation logic including logic for performing cryptographic operations for a plurality of different cryptographic processes; and a state register configured for storing a result of the cryptographic operation.

14 Claims, 15 Drawing Sheets

(56) References Cited

U.S. PATENT DOCUMENTS

| | | | | |
|---|---|---|---|---|
| 2004/0052377 | A1* | 3/2004 | Mattox | H04N 21/26606 380/277 |
| 2005/0149744 | A1* | 7/2005 | Sydir | H04L 63/08 713/189 |
| 2005/0172119 | A1* | 8/2005 | Eckhardt | H04K 1/02 713/160 |
| 2007/0283128 | A1* | 12/2007 | Hoshaku | G06F 9/5094 712/1 |
| 2009/0092252 | A1* | 4/2009 | Noll | H04L 9/0891 380/277 |
| 2011/0225428 | A1* | 9/2011 | Stufflebeam, Jr. | G06F 21/72 713/189 |
| 2011/0225431 | A1* | 9/2011 | Stufflebeam, Jr. | G06F 21/62 713/190 |
| 2012/0300772 | A1* | 11/2012 | Manzella | H04L 49/254 370/389 |
| 2014/0351603 | A1* | 11/2014 | Feix | G06F 21/72 713/189 |
| 2016/0164672 | A1* | 6/2016 | Karighattam | H04L 9/0643 380/28 |
| 2016/0191238 | A1* | 6/2016 | Yap | G09C 1/00 380/44 |
| 2016/0315764 | A1* | 10/2016 | Willemse | G06F 11/0736 |
| 2017/0134163 | A1* | 5/2017 | Suresh | H04L 9/0643 |
| 2017/0243176 | A1* | 8/2017 | Hanke | G06Q 20/0658 |
| 2017/0288855 | A1* | 10/2017 | Kumar | H04L 9/0662 |
| 2017/0293572 | A1* | 10/2017 | Satpathy | G06F 21/72 |
| 2018/0006806 | A1* | 1/2018 | Wang | G09C 1/00 |
| 2018/0052599 | A1* | 2/2018 | Arimilli | G06F 12/0897 |
| 2018/0062829 | A1* | 3/2018 | Suresh | H04L 9/0631 |

\* cited by examiner

FIG. 5

| Off-set | Accelerator | Operation |
|---|---|---|
| 0x00 | AES/SHA/GCM | AES: inv_r=iowdata[0] (Toggle decrypt mode) AES/SHA/GCM: module enable bit (bit number undefined by architecture) |
| 0x04 | AES | Byte write 0 for MixCol (SubBytes(ShiftRows)) |
| 0x08 | AES | Byte write 1 for MixCol (SubBytes(ShiftRows)) |
| 0x0C | AES | Byte write 2 for MixCol (SubBytes(ShiftRows)) |
| 0x10 | AES | Byte write 3 for MixCol (SubBytes(ShiftRows)) |
| 0x14 | AES | state_r=MixCol(state_r) (Used in decrypt only) |
| 0x18 | AES | state_r=SubBytes(ShiftRows)) (Encrypt Final svect. Decrypt. Main loop) |
| 0x1C | AES | state_r=Rcon (SubBytes(Rot)) (Key Schedule) |
| 0x20 | SHA | Message Expansion s0: state_r=s0(iowdata) |
| 0x24 | SHA | Message Expansion s1: cyc0: state2_r=s1(iow data), cyc1: state_r= state2_r + state_r |
| 0x28 | SHA | cyc0: state2_r=iowdata, cyc1: state_r=state_r + state2_r |
| 0x2C | SHA | cyc1: state_r=s1(state2_r) + state_r |
| 0x30 | SHA | cyc1: state_r=s0(state_r) + state2_r |
| 0x34 | SHA | state2_r=iowdata |
| 0x38 | SHA | state2_r=maj(iowdata, state_r, state2_r) |
| 0x3C | SHA | cyc0: state_r=ch(iowdata, state_r, state2_r), cyc1: state_r=state_r+k[1] |
| 0x40 | AES/SHA/GCM | state_r=iowdata |
| 0x44 | GCM | mode_r=iowdata [0] (Switch between Mode 0 and Mode 1) |
| 0x48 | GCM | Clear result register |
| 0x4C | GCM | Write new X input data using half-word swap: (Mode 0) state2_r[31:16]=iowdata [15:0], state2_r [15:0]=iowdata [31:16] |
| 0x50 | GCM | Write lower half of X using half-word swap (mode 0) State2_r [15:0]=iowdata [31:16] |
| 0x54 | GCM | Write new V input data, shuffle old data to X register: (Mode 1) state_r=iowdata, state2_r [31:16]=state2_r[31:16], state2_r[15:0]=state2_r[31:16] |
| 0x58 | GCM | Write new X input data using half-word-swap (Mode 1) state2_r [31:16]=iowdata[15:0]=iowdata [31:16] |
| 0x5C | GCM | Write lower half of new V using half-word swap (Mode 1) state_r [15:0]=iowdata [31:16] |
| 0x60 | GCM | Write upper half of new V using half-word swap, shuffle old data to X register (Mode 1) state_r[31:16]=iowdata [15:0], state2_r[15:0]=state2_r[31:16], state2_r[31:16]=state_r[31:16] |

| OFFSET | ACCELERATOR USAGE | READ DATA |
|---|---|---|
| 0x00 | SHA/GCM | state_r |
| 0x04 | AES | rcon_r (USED AS COUNTER) |
| 0x08 | AES | state_r ^out_mask |
| 0x0C | GCM | res_r |

| GFACC PSEUDO CODE ||
| --- | --- |
| Mode 1 | Mode 0 |
| For i = 0 to 15 do<br>  if (x[15-i])<br>    res = res xor v<br>  v = v rightshift (v)<br><br>res_new = res | For i = 0 to 15 do<br>  if (x[15-i])<br>    res = res xor v<br>  v = rightshift (v)<br>  if (vlsb[i])<br>    v = v xor R<br>v_new = v<br>res_new = res |

TABLE 3

| | $Z_0$ | | |
|---|---|---|---|
| CYCLE | X | V | res_r |
| 1 | $X_7$ | $V_1, V_0$ | - |
| 2 | $X_6$ | $V_2, V_1$ | - |
| 3 | $X_5$ | $V_3, V_2$ | - |
| 4 | $X_4$ | $V_4, V_3$ | - |
| 5 | $X_3$ | $V_5, V_4$ | - |
| 6 | $X_2$ | $V_6, V_5$ | - |
| 7 | $X_1$ | $V_7, V_6$ | - |
| 8 | $X_0$ | $V_8, V_7$ | $Z_0$ |

TABLE 4

| | $Z_1$ | | |
|---|---|---|---|
| CYCLE | X | V | res_r |
| 1 | $X_7$ | $V_2, V_1$ | - |
| 2 | $X_6$ | $V_3, V_2$ | - |
| 3 | $X_5$ | $V_4, V_3$ | - |
| 4 | $X_4$ | $V_5, V_4$ | - |
| 5 | $X_3$ | $V_6, V_5$ | - |
| 6 | $X_2$ | $V_7, V_6$ | - |
| 7 | $X_1$ | $V_8, V_7$ | - |
| 8 | $X_0$ | $V_9, V_8$ | $Z_1$ |

FIG. 18

TABLE 5

| Z | V |
|---|---|
| $Z_0$ | $V_8, V_7, V_6, V_5, V_4, V_3, V_2, V_1, V_0$ |
| $Z_1$ | $V_9, V_8, V_7, V_6, V_5, V_4, V_3, V_2, V_1$ |
| $Z_2$ | $V_{10}, V_9, V_8, V_7, V_6, V_5, V_4, V_3, V_2$ |
| $Z_3$ | $V_{11}, V_{10}, V_9, V_8, V_7, V_6, V_5, V_4, V_3$ |
| $Z_4$ | $V_{12}, V_{11}, V_{10}, V_9, V_8, V_7, V_6, V_5, V_4$ |
| $Z_5$ | $V_{13}, V_{12}, V_{11}, V_{10}, V_9, V_8, V_7, V_6, V_5$ |
| $Z_6$ | $V_{14}, V_{13}, V_{12}, V_{11}, V_{10}, V_9, V_8, V_7, V_6$ |

FIG. 19

TABLE 6

| | $Z_7, V_7 - V_{14}$ | | | |
|---|---|---|---|---|
| CYCLE | X | V | V OUT | RES OUT |
| 1 | $V_0, V_7$ | $V_7, V_6$ | $V_7$ | - |
| 2 | $V_1, V_6$ | v_new | $V_8$ | - |
| 3 | $V_2, V_5$ | v_new | $V_9$ | - |
| 4 | $V_3, V_4$ | v_new | $V_{10}$ | - |
| 5 | $V_4, V_3$ | v_new | $V_{11}$ | - |
| 6 | $V_5, V_2$ | v_new | $V_{12}$ | - |
| 7 | $V_6, V_1$ | v_new | $V_{13}$ | - |
| 8 | $V_7, V_0$ | v_new | $V_{14}$ | $Z_7$ |

LOW COST CRYPTOGRAPHIC ACCELERATOR

CROSS-REFERENCE TO RELATED APPLICATION

This application claims priority to U.S. Provisional Application No. 62/382,703, filed Sep. 1, 2016, the entire contents of which are incorporated herein by reference.

TECHNICAL FIELD

This disclosure relates generally to microcontrollers for use in secure communications.

BACKGROUND

Microcontrollers are increasingly used in systems with a need for secure communications, which typically rely on Advanced Encryption Standard (AES) for encryption and Secure Hash Algorithm 2 (SHA2) for message integrity checking. Lately, also the Galois Counter Mode (GCM) extension to AES has become popular, to allow encryption and authentication in one pass. These cryptographic algorithms can be implemented in software, but this is usually very slow and may require a large code size. The algorithms can also be supported in hardware however, at a prohibitive cost for small microcontroller units (MCUs), which can accept only a few kilo-gates of logic and a few kilobytes of code to support cryptographic libraries. For at least these reasons, cryptographic features are typically only available on higher cost MCUs.

SUMMARY

The disclosed embodiments facilitate acceleration of cryptographic algorithms by using a combination of software and hardware, which provides improved performance over a software-only implementation and incurs a minimal hardware cost. In an embodiment, a central processing unit (CPU) moves n-bits of data (e.g., 32 bits of data) to the hardware accelerator for processing, and then reads the processed result back in a subsequent cycle. The accelerator is able to perform a range of low level operations and/or transformations on the incoming data. The accelerator contains one or more registers, and can use an aliased register map to allow the address of the operation to indicate the operation to be performed. The aliased register map avoids spending an extra cycle to load a command register in the accelerator. In an embodiment, state vectors and control flow are managed by the CPU, and crypto operations are performed in the hardware accelerator.

The disclosed embodiments allow standard cryptographic algorithms to be supported on a variety of MCUs (e.g., a variety of 32-bit MCUs) without being prohibited by cost constraints, thereby opening a potentially huge market for low-cost n-bit MCUs with cryptographic algorithm support. The low cost is accomplished by designing a hardware accelerator to speed up the central processing unit (CPU) execution of the cryptographic algorithms rather than design dedicated hardware modules for standalone crypto operations.

The disclosed embodiments assume that the CPU is fully available for cryptographic operations while executing, although in some implementations, interrupts are supported. The disclosed embodiments also assume that the cryptographic algorithms execute one at a time, allowing logic and registers to be shared where applicable.

In an embodiment, the accelerator is optimized for use with a single-cycle bus interface (e.g., ARM Inc.'s single-cycle IOBUS interface) to the CPU (e.g., found in ARM's Cortex-M0+ and Grebe processors), but works equally well for a co-processor interface (e.g., ARM's Teal processor). The disclosed embodiments can also be used with any conventional system bus found in any MCU, but cycle count is optimal if the CPU has single-cycle access to accelerator registers.

In an embodiment, a system comprises: a central processing unit (CPU); memory storing instructions, which, when executed by the CPU, cause the CPU to perform operations comprising: obtaining cryptographic data, the cryptographic data indicating a particular cryptographic process to be performed on the cryptographic data; performing a first cryptographic operation on the cryptographic data according to the cryptographic process; sending the cryptographic data to a hardware accelerator; and receiving, from the hardware accelerator, cryptographic data transformed by the hardware accelerator using a second cryptographic operation according to the cryptographic process that is different than the first cryptographic operation.

In an embodiment, a cryptographic accelerator comprises: an interface configured to receive cryptographic data, the cryptographic data indicating a particular cryptographic process to be performed on the cryptographic data; transformation logic configured to perform a cryptographic operation on the cryptographic data according to the cryptographic process, the transformation logic including logic for performing cryptographic operations for a plurality of different cryptographic processes; and a state register configured for storing a result of the cryptographic operation.

Other embodiments are directed to methods and non-transitory, computer readable storage mediums. The details of one or more implementations of the subject matter are set forth in the accompanying drawings and the description below. Other features, aspects and advantages of the subject matter will become apparent from the description, the drawings and the claims.

BRIEF DESCRIPTION OF THE DRAWINGS

FIG. 5 is a table illustrating a CRYA address map, according to an embodiment.

FIG. 18 contains tables illustrating X and V input to $Z_0$ and $Z_1$ calculations, respectively, according to an embodiment.

FIG. 19 is a table illustrating a V input for partial Z calculation, according to an embodiment.

DETAILED DESCRIPTION

Overview

The CRYA module accelerates the inner loops of AES, SHA-256 and the GF ($2^{128}$) multiplication of GCM, allowing efficient hardware-software (HW-SW) implementation of these cryptographic algorithms, with a minimal gate count. In the description that follows, these cryptographic algorithms will each be briefly presented, followed by specific requirements of the CRYA module, followed by a description of the overall architecture and key requirements of the CRYA module, followed by a description of the detailed architecture of a specific embodiment. The disclosure that follows assumes the CRYA module is developed for a CPU with single-cycle I/O port, such as the ARM Cor-tex-M0+ or Grebe processors, since these are the most likely host CPUs in a system embedding the CRYA module. The CRYA module, however, can be bus mapped to any CPU.

Crypto Algorithm Overview—AES

AES creates a ciphertext of a plaintext block of size 128 bits. The key is either 128, 192 or 256 bits. The basic algorithmic steps to encrypt a 128-bit plaintext block, P, to a 128-bit encrypted block, C, is as follows:
AddRoundKey—XOR of key with state
Loop 1 . . . 9 (for 128 bits. Loop to 11 for 192 and to 13 for 256 bits)
    ShiftRows—Transposition—shift bytes around
    SubBytes—Lookup table or calculation
    MixColumn—GF ($2^8$) multiplication with a polynomial
    AddRoundKey—XOR of key with state
ShiftRows
SubBytes
AddRoundKey In this AES algorithm, each AddRoundKey operation uses a unique 128, 192 or 256-bit key, which is derived from an initial key.

Figure 1:
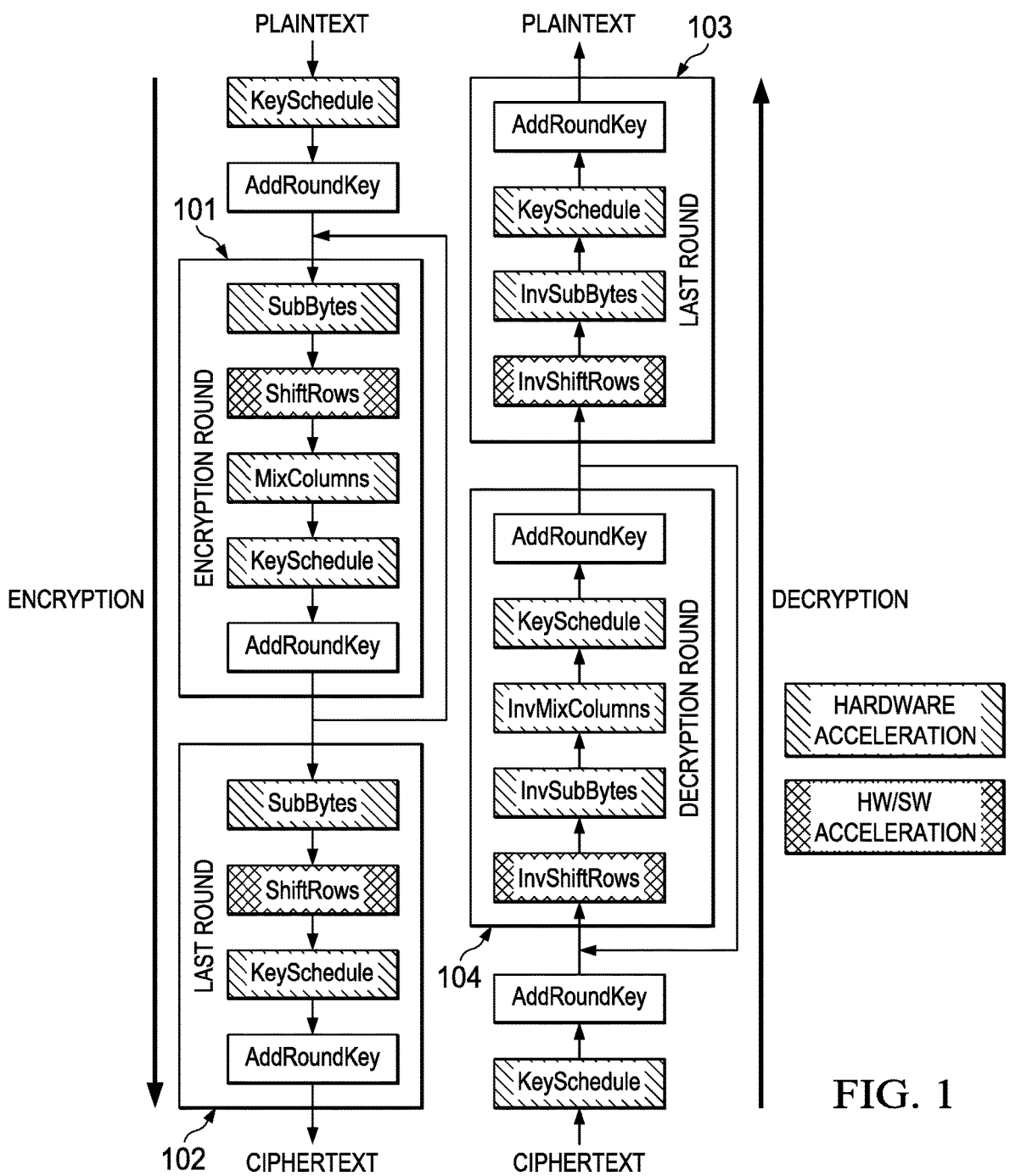
FIG. 1 is a flow diagram illustrating dataflow of AES operations and CRYA acceleration, according to an embodiment.

Decrypting a 128-bit cipherblock, C, to a 128-bit plaintext block, P is done similarly:
AddRoundKey—XOR of key with state
Inverse ShiftRows
Inverse SubBytes
Loop 1 . . . 9 (for 128 bits. Loop to 11 for 192 and to 13 for 256 bits)
    AddRoundKey—XOR of key with state
    Inverse MixColumn—GF ($2^8$) multiplication with a polynomial
    Inverse ShiftRows—Transposition—shift bytes around
    Inverse SubBytes—Lookup table or calculation
    AddRoundKey FIG. 1 is a flow diagram illustrating dataflow of AES operations, according to an embodiment. On the left side is the encryption dataflow and on the right side is the decryption dataflow. AES encryption includes encryption round 101 and last encryption round 102. AES decryption includes decryption round 103 and last decryption round 104. For AES encryption, the CRYA module will use hardware acceleration for KeySchedule, SubBytes and MixColumns operations, and a combination of hardware and software for ShiftRows operations. For AES decryption, the CRYA module will use hardware acceleration for KeySchedule, InvSubBytes and InvMixColumns operations, and a combination of hardware and software for InvShiftRows operations.

The round keys can be precalculated before the encryption or generated on-the-fly in each round. In an embodiment, round keys can be generated on-the-fly using a Rijndael Key Schedule, which is accelerated by hardware in the CRYA module. The Rijndael key schedule expands a short key into a number of separate round keys. There are three AES variants, each of which have a different number of rounds. Each variant requires a separate 128-bit round key for each round plus one more. The Rijndael key schedule produces the needed round keys from an initial key.

Crypto Algorithm Overview—SHA-256

SHA-256 is a cryptographic hash function that creates a 256-bit hash of a data block. The data block is processed in chunks of 512 bits. For each 512-bit chunk, there are two loops processing the input data and the current hash: Message Expansion (48 iterations) and Compression Function (64 iterations). In an embodiment, the CRYA module accelerates the Message Expansion loop, and the Compression Function loop as described in further detail below.

Crypto Algorithm Overview—GCM

GCM is Galois/Counter mode, a mode of operation for AES that combines the CTR (Counter) mode of operation with an authentication hash function. Most of the GCM can be easily implemented in software, but it also includes a finite field multiplication in GF ($2^{128}$) that is slow to calculate in software. In an embodiment, the CRYA module is used to accelerate this multiplication in a low-cost implementation. The multiplier in the CRYA architecture needs 2×32-bit+16-bit registers and uses 320 cycles for a 128×128 GF ($2^{128}$) multiplication. The algorithm of GF ($2^{128}$) multiplication can be found in The Galois/Counter Mode of Operation as algorithm 1. The algorithm uses a bit-reversed notation where the least significant bit (LSB) is bit 127 and the most significant bit (MSB) is 0. In the disclosure that follows, standard VERILOG® notation will be used for bit-ordering.

Module Architecture—Module Requirements

CRYA supports AES and SHA-256. For AES, the CRYA module accommodates the following modes of operation:

ECB, CBC, CFB, OFB, CTR, CCM/CCM* and GCM. The CRYA module accelerates the hash function of the GCM mode of operation, while the other modes of operation are implemented with software libraries. The AES encryption supports 128, 192 and 256-bit key lengths. In addition to encryption, the CRYA module supports accelerated AES decryption. The CRYA module is configured to interface with a CPU using, for example, the I/O Port of a Grebe CPU. In an embodiment, the CRYA module can re-use registers that are used to support the different crypto algorithms such that all the supported crypto algorithms use the same registers for state. In an embodiment, the crypto accelerators for each crypto algorithm run simultaneously. In an embodiment, the CRYA module includes countermeasures against side-channel attacks as described in further detail below. In an embodiment, the CRYA module gate count is approximately 5.5 kilo-gates. The CRYA module is configured to implement all the functions summarized in Table 1 shown in FIG. 5, with the code size, cycle count and gate count constraints specified.

Hardware/Software Interface Concepts

The basic principle of the accelerator is to write a word from the CPU register file to the state register in the accelerator, wait one cycle, and then read a transformed value back from the accelerator state register to the CPU register file. Depending on the address chosen for the write, a set of defined acceleration functions will be performed on the state register. Two different architectures for the dataflow are described below. A first architecture, referred to as the REG to REG, is used for AES and GCM acceleration. A second architecture, referred to as REGIN, is used for SHA acceleration.

Figure 2:
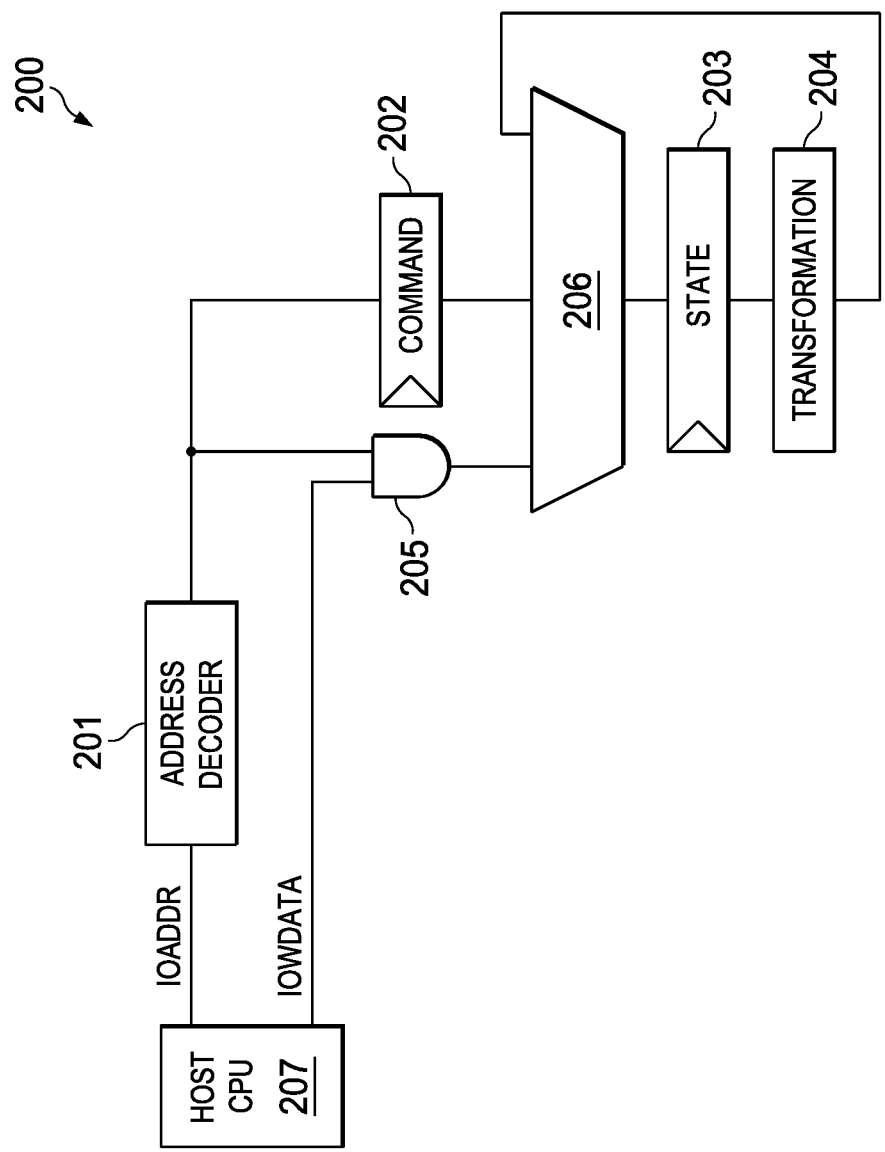
FIG. 2 is a block diagram of a register-to-register (REG to REG) accelerator architecture, according to an embodiment.

FIG. 2 is a block diagram of register-to-register (REG to REG) accelerator architecture 200, according to an embodiment. Architecture 200 includes address decoder 201, command register 202, state register 203, transformation logic 204, AND gate 205 and multiplexer 206. The I/O address (IOADDR) is decoded to provide a command in command register 202. The command stored in command register 202 provides a selection signal for selecting one of two inputs into multiplexer 206. A first input into multiplexer 206 is the output of AND gate 205 and the second input into the multiplexer 206 is the output of transformation logic 204. AND gate 205 receives as inputs IODATA and the output of address decoder 201. The output of multiplexer 206 is stored in state register 203.

Figure 3:
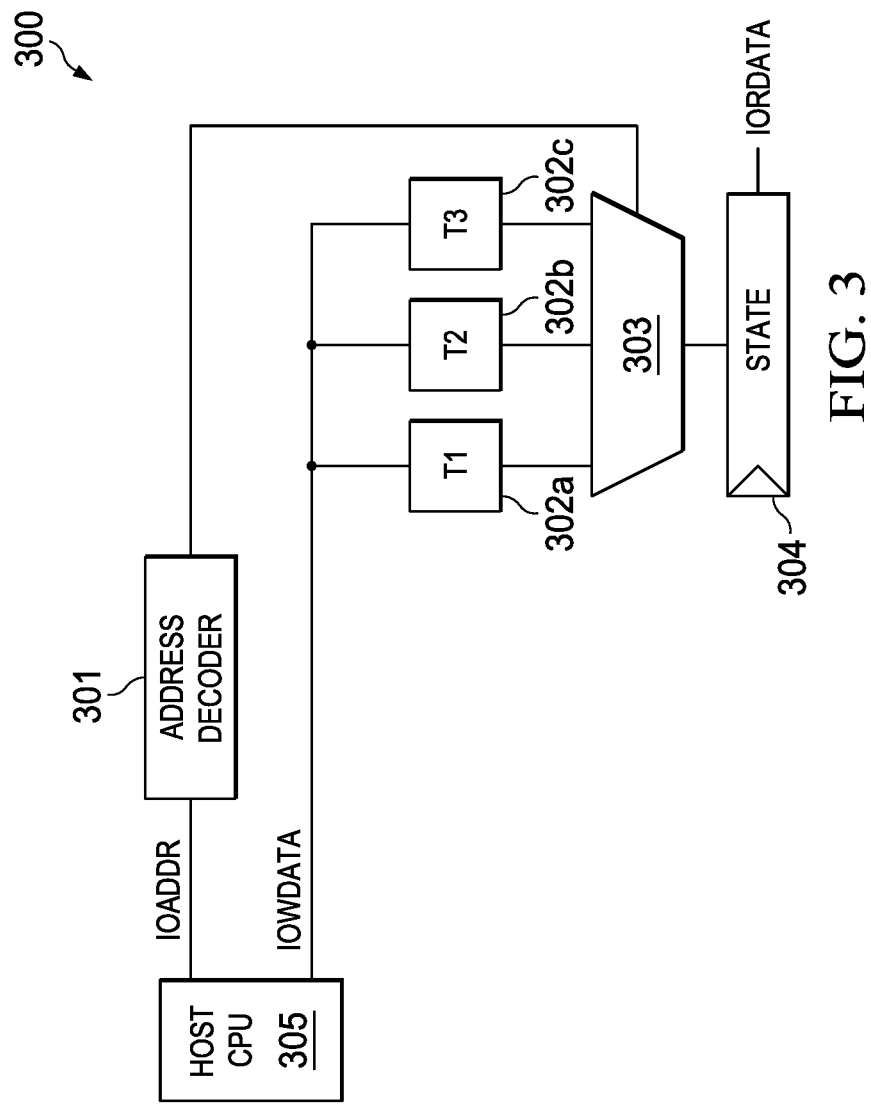
FIG. 3 is a block diagram of an in-to-register (REGIN) accelerator architecture, according to an embodiment.

In REG to REG architecture 200, the input/output (I/O) Port timing is independent of the transformation logic depth. To do this, command register 202 is used, such that the command is registered based on the I/O Port address during the data write. This ensures that any deep logic in transformation logic 204 is independent of the I/O Port timing, so that only the following timing paths exist:

REGIN: CPU_IR→I/O Port→address decode→register
REG to REG: register→transformation logic→register
REGOUT: register→I/O Port→CPU_RF FIG. 3 is a block diagram of in-to-register (REGIN) accelerator architecture 300, according to an embodiment. Architecture 300 includes address decoder 301, transformation logic 302*a*-302*c*, multiplexer 303 and state register 304. IOADDR is decoded by address decoder 301 to provide a selection signal for selecting one of three inputs into multiplexer 303. A first input into multiplexer 303 is the output of transformation logic 302*a* (T1), the second input into multiplexer 303 is the output of transformation logic 302*b* (T2) and the third input into multiplexer 303 is the output of transformation logic 302*c* (T3). The output of multiplexer 303 is stored in state register 304.

REGIN is used on transformations with shallow logic depth, such as writing a word to state register 304. The data is transformed in the same cycle before being registered in the accelerator. Then, read the transformed value back from the accelerator state register 304. The CRYA module has been designed to ensure the timing path is not limiting for the synthesis Quality of Result (QoR).

Accelerator Hardware Implementation

Figure 4:
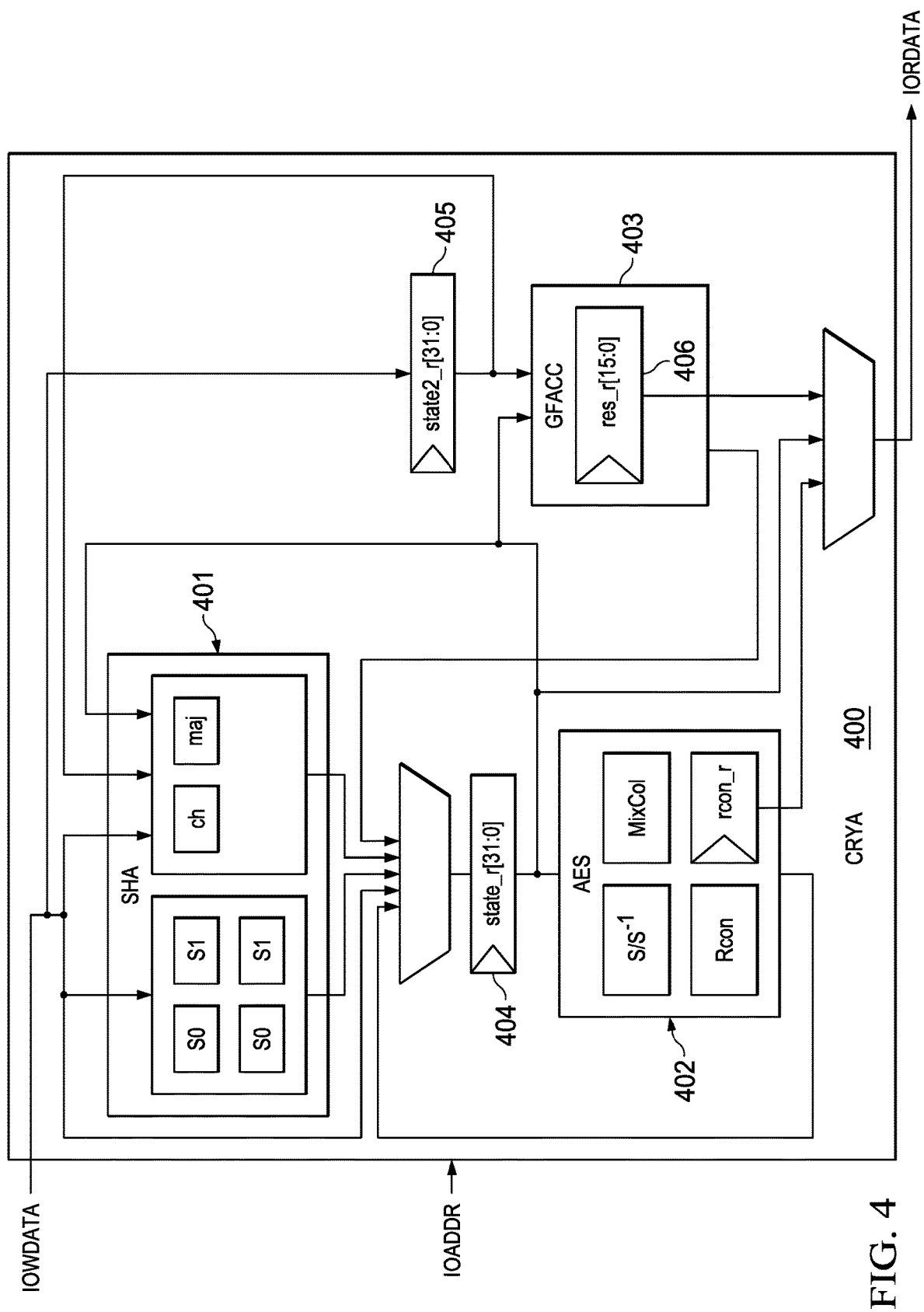
FIG. 4 is a block diagram of a Crypto Accelerator (CRYA) module, according to an embodiment.

FIG. 4 is a block diagram of CRYA module 400, according to an embodiment. CRYA module 400 includes SHA accelerator 401, AES accelerator 402 and GFACC accelerator 403. Using the CPU register file as a working state, the number of data registers in the CRYA module is reduced. AES accelerator 402 requires one 32-bit register 404. SHA accelerator 401 requires one 32-bit register 404. GFACC accelerator 403 (the GCM GF ($2^{128}$) multiplication operator) requires two 32-bit registers 404, 405 and one 16-bit register 406, which sets a lower limit for CRYA module 400. Since GCM is supported in CRYA module 400, SHA accelerator 401 can also use extra 32-bit register 404 to reduce the cycle count in the software part. This register sharing is illustrated in FIG. 4, where state2_r of register 405 is used by GFACC accelerator 403 and ch/maj of SHA accelerator 401.

In an embodiment, accelerators 401, 402, 403, described above are integrated into one hardware peripheral module. The gate count is small as possible while minimizing the algorithm cycle counts. CRYA module 400 contains an I/O port interface (not shown), an address decoder (not shown), two 32-bit registers 404, 405, and one 16-bit register 406 (used for GCM). These registers can be re-used by SHA and AES accelerators 401, 402.

Figures 6, 7:
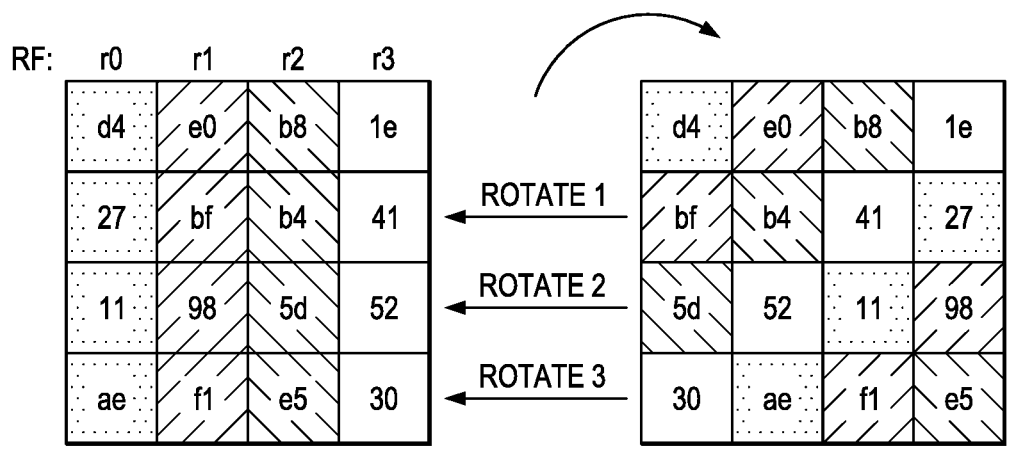
FIG. 6 is a table illustrating a CRYA read address map, according to an embodiment.
FIG. 7 illustrates an AES shift rows operation, according to an embodiment.

In an embodiment, CRYA module 400 uses the write and read address maps shown in FIGS. 5 and 6, respectively. Table 1 in FIG. 5 shows a write address map that includes a first column of address offsets, a second column indicating which accelerator(s) is performing the operation, and a third column describing the operation performed by the accelerator(s). Table 2 in FIG. 6 shows a read address map that includes a first column of address offsets, a second column indicating which accelerator(s) will perform an operation and column 3 indicates the register that is read. Note that in Tables 1 and 2, the address offset also indicates the operation to be performed (i.e., an aliased register map).

Accelerator Hardware—Integration for
Cortex-M0+/Grebe Systems

In an embodiment, the CRYA module can be integrated with Cortex-M0 or Grebe processors developed by ARM Inc. of San Jose, Calif., USA. In this embodiment, the hardware CRYA module shares clock and reset with the Grebe HCLK and HRESETn ports. The CRYA module is interfaced using the Grebe I/O Port. The CRYA module does not need to be retained in Standby mode. The CRYA module uses no interrupts since it is completely CPU-driven. For Grebe, the CRYA module is inaccessible for read and write by non-secure accesses when the module is configured to be secure by a peripheral access controller (PAC). For example, the PAC (e.g., an AT03229: SAM D/R/L/C PAC developed by Atmel Inc.) can be used to restrict write access to the CRYA module through the AMBA High-Performance bus (AHB) to registers used by the CRYA module, making the registers non-writable.

The CRYA module uses the I/O Port signal IONONSEC to identify non-secure access. The CRYA module uses the PAC signal apb_secure to determine that the module is secured by the PAC. The read data bus should read all 0 when an access is non-secure and module PAC secured. Write operations have no effect when an access is non-secure and module PAC secured. CRYA_pslverr can be asserted for one clock cycle or more when an access is non-secure and module PAC secured. The CRYA module is clock-gated by an enable bit so that no logic is toggling when the CRYA module is not enabled. This can be done using automatic clock gate insertion by updating all registers (except enable register) only when the enable bit is set. The CRYA module can also use an on-demand clock. This method connects a clk_req signal to the system clock controller and an IOTRANS event in the CRYA module, provided the timing path for clock request is not limited.

Accelerator Software Implementation—SHA Software

In an embodiment, input to a CRYA SHA software library can be a pointer to a 512-bit data block, a pointer to a hash location to be updated, or a pointer to temporary memory buffer (e.g., 256 bytes of RAM). The CRYA SHA software library can update the hash value based on the 512-bit data. In an embodiment, the message is already pre-processed properly for the SHA algorithm, such that the CRYA software delivery for SHA can work directly on 512-bit chunks. In an embodiment, the CRYA SHA software library is implemented with acceleration using the CRYA module. In an embodiment, a Message Schedule loop of 18 cycles per iteration and a compression loop of 21 cycles per iteration are implemented by the CRYA module.

Accelerator Software Implementation—AES Software

Input to the CRYA AES software routine should be a pointer to a 128-bit data block to be encrypted, a 128, 192 or 256-bit key, and a pointer to the desired location of the output data. Output of the CRYA AES software routine should be the 128-bit encrypted data, stored at the location pointed to by the calling function. The CRYA AES software routine should use the CRYA AES hardware acceleration to reduce the cycle count to as few cycles as possible. One iteration of the AES repetition loop takes 48 cycles in the reference implementation.

Accelerator Software Implementation—GCM Software

In an embodiment, the CRYA module accelerates the GF ($2^{128}$) multiplication of the GCM mode of operation. Input to the software deliverable can be two pointers to 128-bit data blocks that are to be multiplied, and a pointer to a location for storing the result. A CRYA software library can perform this multiplication using CRYA GCM hardware acceleration. In an embodiment, the cycle count for a GF ($2^{128}$) multiplication is 320 cycles with a code size of 240 bytes.

Side-Channel Attack Prevention

Cryptographic implementations are sensitive to side-channel attacks such as timing attacks and power analysis attacks. To protect leaking information on the timing side-channel, it is important that the cryptographic algorithms run in constant time with no dependency on the input data/key. In an embodiment, the CRYA module runs in constant time.

For AES, it is important to not leak information about the plaintext data or the key. In an embodiment, the CRYA module implements side-channel protection against power analysis attacks using masking. In an embodiment, the masking is implemented as XOR operations in hardware. For example, a masked S-box implementation can be used. The masked S-box uses two random and independent 8-bit masks, which can be regenerated for each 16B block. A higher-level software function can be used to set up random masks in the CRYA module before calling low-level CRYA software.

For SHA, it is important to not leak information about the message data that is being hashed. In an embodiment, this is done by an overlying secure code function—the CRYA part of SHA will not be affected by the side-channel protection.

For GF ($2^{128}$) multiplication, side-channel protection mechanisms are not required.

Example AES Architecture

As previously disclosed in reference to FIG. 1, the following AES operations can be accelerated by the CRYA module:

SubBytes/InvSubBytes
MixColumn/InvMixColumn
KeySchedule
ShiftRows

The main part of the AES algorithm consists of the following sequence: ShiftRows→SubBytes→MixColumns. The CRYA module architecture keeps the AES data state (128-bit) in the CPU register file (e.g., Grebe register) and transforms 32 bits at a time using the cryptographic accelerator. The 128-bit data block can be viewed as a 4×4 matrix of bytes, where each column is a 32-bit register in the CPU register file.

FIG. 7 illustrates an AES shift rows operation, according to an embodiment. The CRYA module needs data from each of the columns to form the first row of the new state matrix so we need four store operations:

str r0, [r7, #0x10]
str r1, [r7, #0x14]
str r2, [r7, #0x18]
str r3, [r7, #0x1c]
nop // Required when using REG to REG transformation
ldr r4, [r7, #0x10]//New state 0 is now in r4

During the "nop" cycle, the CRYA also performs the SubBytes and MixColumns and the transformed data is then read back to the Grebe register file. For the 128-bit data block, this sequence of instructions is performed four times, while rotating the source registers. The following code shows the next sequence, and the pattern can be seen from that:

str r1, [r7, #0x10]
str r2, [r7, #0x14]
str r3, [r7, #0x18]
str r0, [r7, #0x1c]
nop // Required when using REG to REG transformation
ldr r5, [r7, #0x10]//New state 1 is now in r5

For every store cycle, we only keep 8 bits. This means that we can use an 8-bit S-box four times without losing any cycles. Using four 8-bit S-boxes in parallel on the complete 32-bit data would make for a simpler implementation, but the area of one S-box can be over 500 gates, so it is desirable to instantiate only one. This can be done by implementing a control register to select the input of the S-box. In an embodiment, a 2-bit counter is used.

According to the AES algorithm, for every new 128-bit state that is generated, a new key can be created and used in the AddRoundKey operation (which is a simple XOR of key and state). Using the Rijndael Key Schedule, creating a new key requires a 32-bit SubBytes (S-box) transformation.

If we were using four 8-bit S-boxes, the software would look like this:
  str r3, [r1, #0x28]//Store word 3 of previous key
  nop // Required for REG to REG transformation
  ldr r3, [r1, #0x10]//Load S-box transformed 4-byte word
  Using only one 8-bit S-box gives
  str r3, [r1, #0x28]//Store word 3 of previous key
  nop // S-box of 1st byte
  nop // S-box of 2nd byte
  nop // S-box of 3rd byte
  nop // S-box of 4th byte
  ldr r3, [r1, #0x10]//Load S-box transformed 4-byte word Fortunately, the instructions that follow do not have any data dependency so we can stuff the nop with useful instructions so that we do not lose any cycles:
str r7, [r5, #0x28]//Store word 3 of previous key
mov r6, r10 //Key2 to r2 (Filler instruction for S-box of 1st byte)
eors r2, r6 //r2=NextState2 (Filler instruction for S-box of 2nd byte)
eors r3, r7 //r3=Nextstate3 (Filler instruction for S-box of 3rd byte)
mov r4, r8 //Key 0 to r0 (Filler instruction for S-box of 4th byte) ldr r5, [r5, #0x10]//Load the S-box data back The Rijndael key schedule also includes a byte rotate left, and an XOR with Rcon, which requires an additional 8-bit register. Rcon is transformed for each new key, where $Rcon_1$ is a function of $Rcon_{-1}$.

Considering the entire AES algorithm, there are three different operations that are similar but that all share the SubBytes step:
  1. Main loop ShiftRows→SubBytes→MixCol
  2. KeySchedule ByteRotate→SubBytes→Rcon
  3. Final step (After loop) ShiftRows→SubBytes Because the delay through SubBytes and MixCol requires use of a REG to REG architecture, separate "command" registers are used to select the correct operations in the three cases. The operation select cannot be dependent directly on the I/O Port address. In an embodiment, three such registers are used, but two may be used.

During decryption includes performing SubBytes and MixCol operations inversely, which means passing a signal to the hardware blocks. Decryption also changes the direction of Rcon. This requires us to have a register to indicate that an AES decrypt operation is to be performed. This bit can be set from software when starting a decrypt, and cleared when starting an encrypt.

Figure 8:
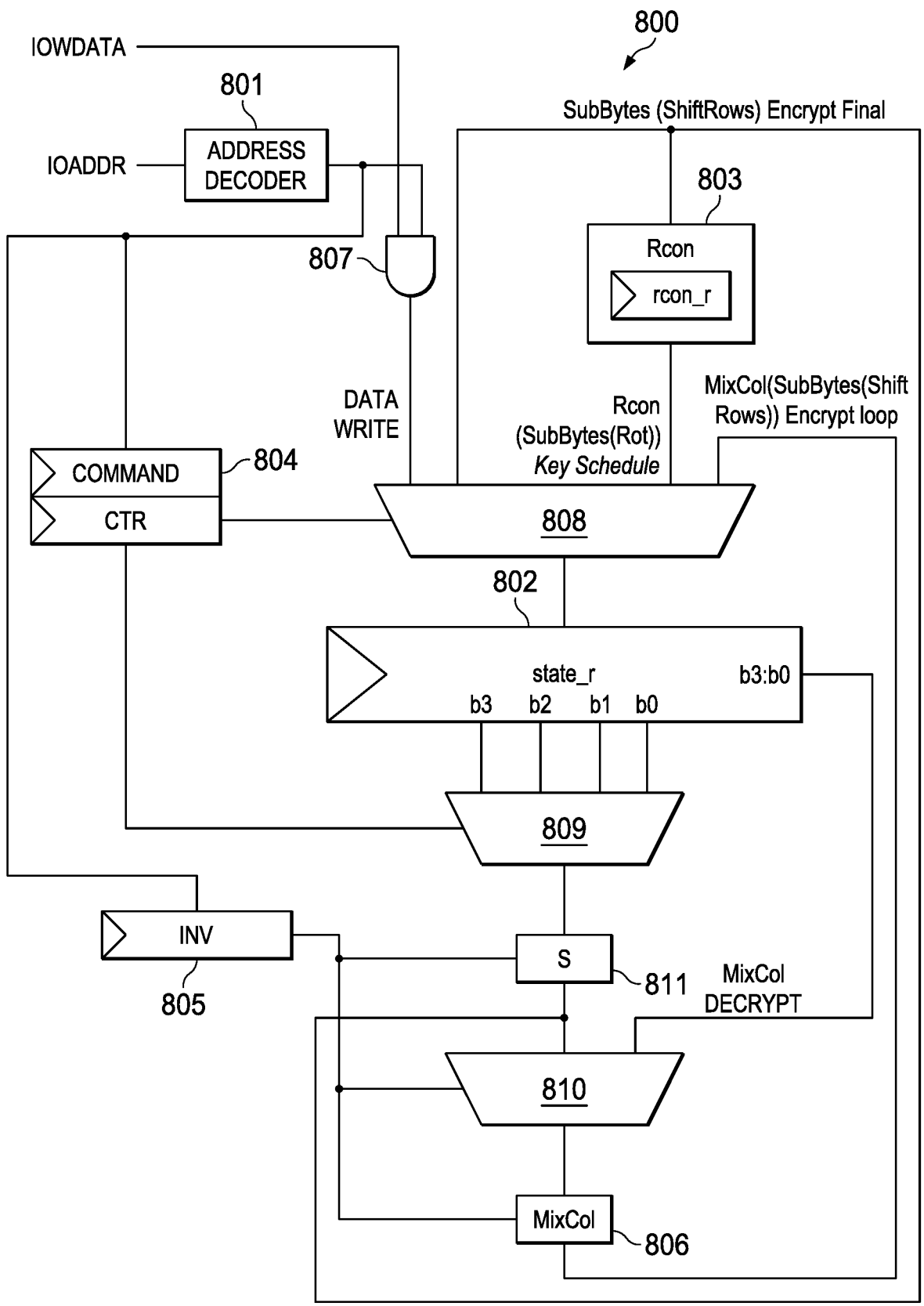
FIG. 8 is a block diagram of a CRYA module, according to an embodiment.

A block diagram of the AES part 800 of the CRYA module is shown in FIG. 8. The AES part 800 includes address decoder 801, state register 802 (state_r), register 803 (rcon_r), command register/counter 804, register 805 (inv), MixCol logic 806, AND gate 807, multiplexer 808, multiplexer 809, multiplexer 810 and S-box 811.

In an embodiment, state register 802 is 32-bit and is used as source and destination for all transformations. It is then read on the I/O Port. The annotations on the dataflow show which sequence of transformation is being performed and, in cursive font, what part of the algorithm it represents. For example, one line of dataflow going into state multiplexer 808 is SubBytes (ShiftRows) Encrypt Final. This means that this dataflow is active in the final step of the encryption algorithm, after the loop, to do ShiftRows and then SubBytes. Multiplexers 809, 810, are controlled by command register/counter 804 and invert register 805, respectively.

Example AES Side-Channel Attack Protection

Figure 9:
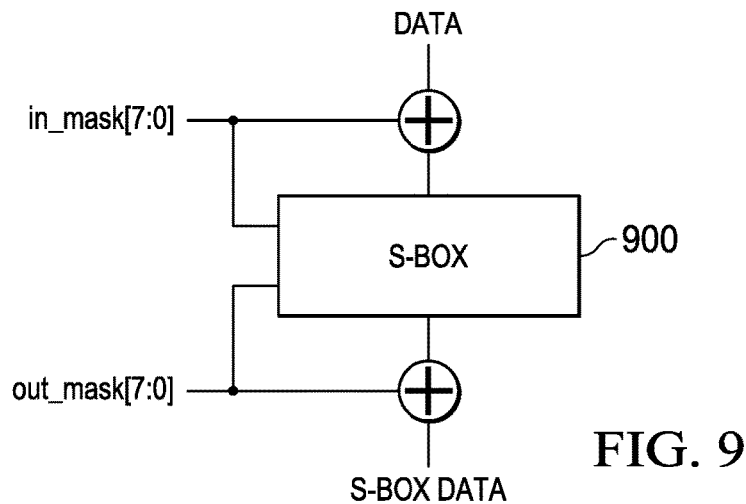
FIG. 9 is a block diagram illustrating masked S-box usage, according to an embodiment.

FIG. 9 is a block diagram illustrating masked S-box usage, according to an embodiment. In an embodiment, the S-box 900 is a "masked" S-box. This embodiment is able to support a masked AES implementation, which makes it more resilient towards side-channel attacks using differential power analysis. In an embodiment, the CRYA module uses additive masking, which means XORing values with a mask. A masked value can be used through all steps in AES, which are linear, and then get the unmasked data back using a new XOR.

The S-box 900, however, is a non-linear transformation. In an embodiment, the S-box 900 takes three inputs—data byte to be substituted, and a byte-sized input mask and a byte-sized output mask. The data going into the S-box 900 is first to be masked with the same mask that is given as input to the S-box 900, and the data output of the S-box 900 is unmasked using the same mask that is given as output mask to the S-box 900. Since the MixColumns operation is linear, the output masking can be done after this.

In an embodiment, the optimal area and code size can be obtained by doing the input masking at the input of the S-box 900, and the output masking in the I/O read path:
  CRYA_iordata=state_r ˆ{4{sbox_out_mask}};
Note that this read is not the same as the stater read used by other parts of the CRYA module and an address decoder is used to select this read data based on the I/O address.

The Key Schedule also uses the S-box 900. This part will be masked in the same way as the data. For example, masking is done at the S-box input and unmasking in the I/O read path. The input and output masks, "sbox_in_mask [7:0]" and "sbox_out_mask [7:0]" are stored in state2_r, which is otherwise unused in the AES part of CRYA.

The selection of input and output masks should be random and independent of each other. For every 16B data block to be encrypted, a new pair of input and output masks can be used. The CRYA module can use the state2_r [7:0] register for input mask and state2_r [15:8] register for the output mask, but the CRYA software should not implement the writing of masks into the CRYA module. The CRYA software should assume a valid random number pair is present in state2_r, and it is the responsibility of a higher-level software routine to write the numbers into CRYA state2_r before executing the CRYA software on a 16B data block.

Example SHA Architecture

The SHA-256 algorithm was previously described and the pseudo code is reprinted here as reference.
  Message expansion:
  for i from 16 to 63
  s0:=(w[i−15] rightrotate 7) xor (w[i−15] rightrotate 18) xor (w[i−15] rightshift 3)
  s1:=(w[i−2] rightrotate 17) xor (w[i−2] rightrotate 19) xor (w[i−2] rightshift 10)
  w[i]:=w[i−16]+s0+w[i−7]+s1
  Compression function main loop:
  for i from 0 to 63
  S1:=(e rightrotate 6) xor (e rightrotate 11) xor (e rightrotate 25)

ch:=(e and f) xor ((not e) and g)
temp1:=h+S1+ch+k[i]+w[i]
S0:=(a rightrotate 2) xor (a rightrotate 13) xor (a rightrotate 22)
maj:=(a and b) xor (a and c) xor (b and c)
temp2:=S0+maj
h:=g
g:=f
f:=e
e:=d+temp1
d:=c
c:=b
b:=a
a:=temp1+temp2

The SHA algorithm above includes performing logic operations (s0, s1, S0, S1, ch, maj) and adding the results together with words from the expanded message (w[i]) and words from the SHA constant table (k[i]).

Example Compression Function

In an embodiment, the SHA constant table is 64 words, one word for each iteration of the compression loop. The expanded message is also 64 words. Every iteration of the compression loop consumes a message word and a constant word, referred to as w[i] and k[i]. The SHA working variables a, b, c, d, e, f, g, h, are updated and cycled for each iteration of the compression loop. In the CRYA module, the software keeps the working variables in the CPU register file and writes the working variables into the CRYA module for transformation as the algorithm dictates. The CRYA module includes two 32-bit state registers, state_r and state2_r, and a 32-bit adder. The CRYA module also includes the full SHA constant table, K, as a hardware lookup table.

Figure 10:
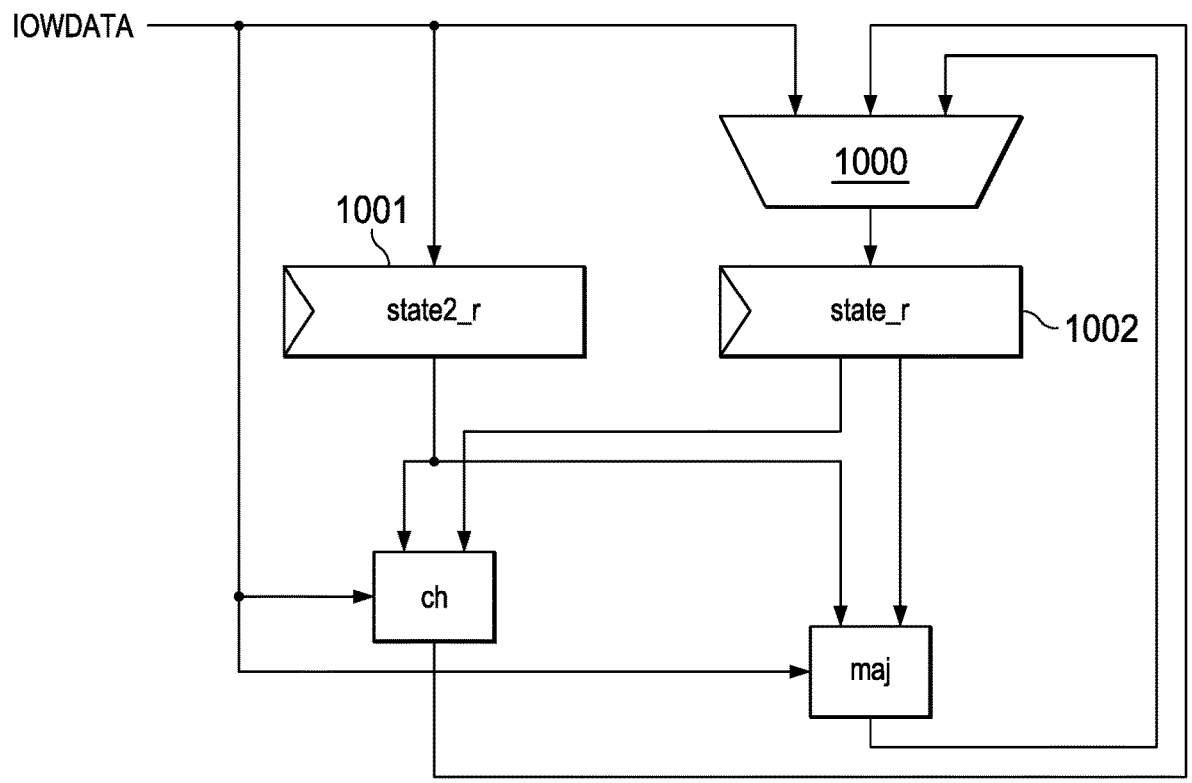
FIG. 10 is a block diagram illustrating SHA ch and maj calculations, according to an embodiment.

Using these resources, the software implementation needs to:
1) Load w[i] from RAM
2) Write w[i] to CRYA module
3) Write working variables used for transformations to CRYA module
4) Load transformed data from CRYA module
5) Manage working variables in register file The following pseudo code describes the data accumulation in the CRYA module. Each line corresponds to a clock cycle.
state_r=ch
state_r=ch+k[i]
state_r=ch+k[i]+w[i]
state_r=ch+k[i]+w[i]+S1=temp1
Load state_r to register file, state_r freed
state2_r=maj
state_r=S0+maj
state_r=S0+maj+temp1
Load state_r to register file, state_r freed FIG. 10 is a block diagram illustrating SHA ch and maj calculations, according to an embodiment. The calculation of maj and ch uses three operands. The software first stores, via the output of multiplexer 1000, operator 1 to register 1002 (state_r), then operator 2 to register 1001 (state2_r), then the next store is used directly so that: state_r=ch/maj (state_r, state2_r, iowdata).

Figure 11:
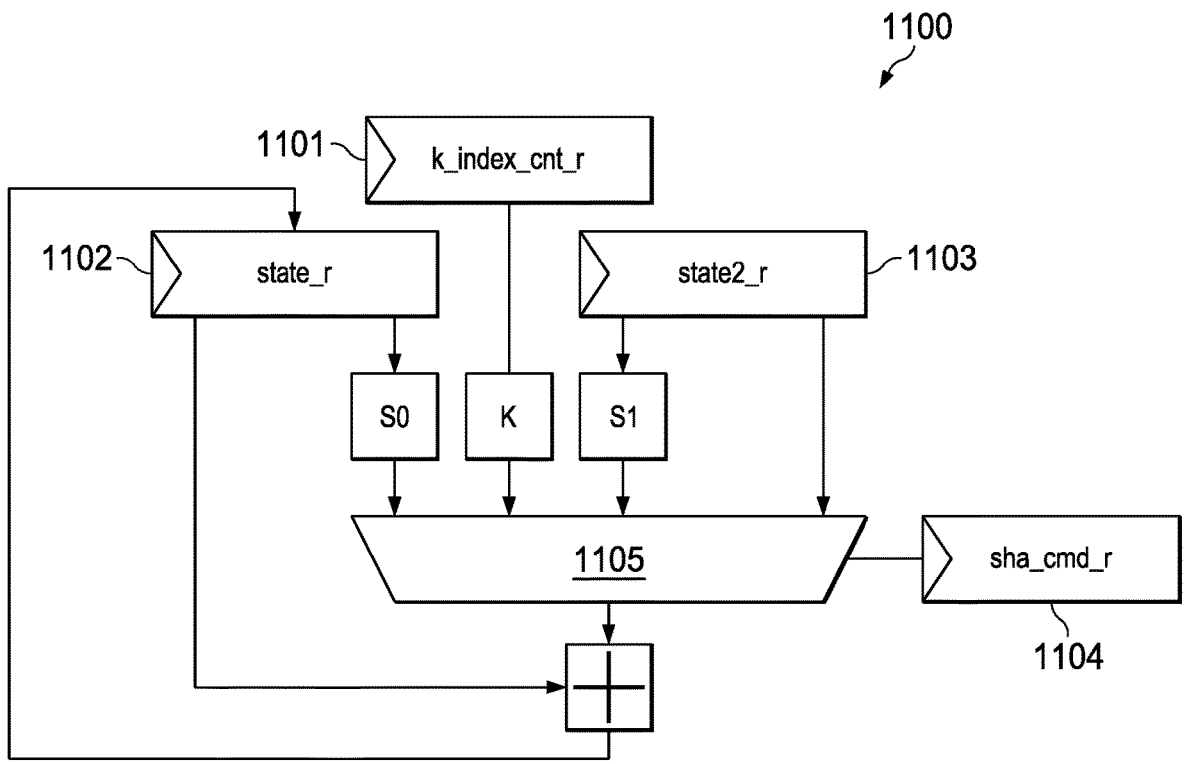
FIG. 11 is a block diagram illustrating an SHA adder usage operation, according to an embodiment.

An example embodiment of adder architecture 1100 is shown in FIG. 11. The adder adds the contents of register 1102 (state_r) with another operand, selected by command register 1104 (sha_cmd_r) coupled to multiplexer 1105. It is important that both operands and the select are independent of the bus (IOWDATA/IOADDR) because of the long timing path through the adder architecture 1100. In the figure, K is the constant lookup table, indexed by the index counter in register 1101 (k_index_cnt_r). The counter is incremented for every compression function iteration so that new k[i] values are used. Command register 1104 is updated based on the address used for writes. It is updated along with the write data going to register 1102 (state_r) and register 1103 (state2_r).

Example Message Expansion

Figure 12:
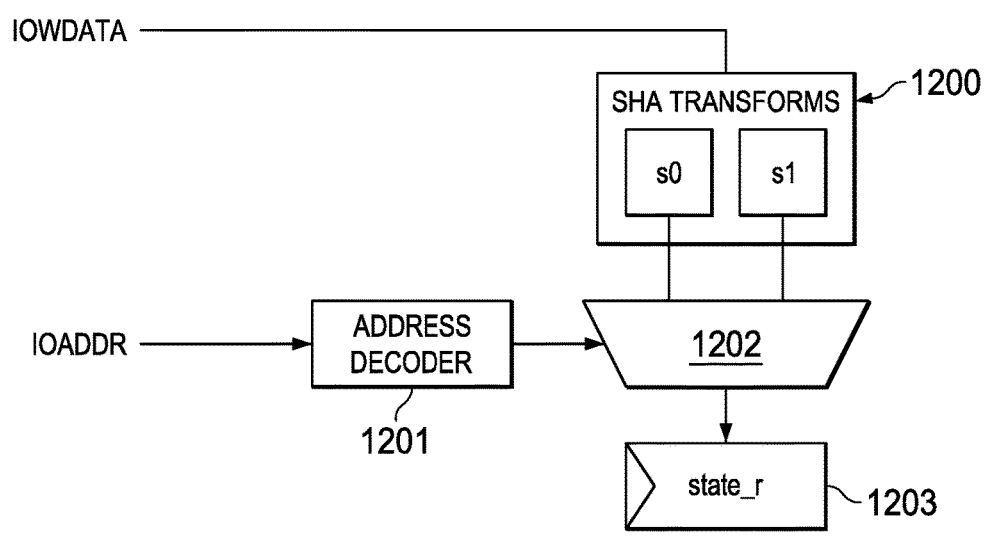
FIG. 12 is a block diagram illustrating an SHA message expansion operation, according to an embodiment.

The message expansion loop uses the same principle as the compression function—stored values are transformed and accumulated:
State_r=s0
State_r=s0+s1
State_r=s0+s1+w[i−7]
State_r=s0+s1+w[i−16]
Load state_r to register file FIG. 12 illustrates a REGIN timing model used in the message expansion transformation. The model includes SHA transforms 1200, multiplexer 1202, address decoder 1201, multiplexer 1202 and state register 1203. The adder structure shown in FIG. 11 is used in the cycle following the REGIN transformation.

Example GCM Architecture

In an embodiment, the CRYA module accelerates the GF ($2^{128}$) multiplication of the GCM mode of operation. The multiplication algorithm from The Galois/Counter Mode of Operation is reproduced below (Algorithm 1) with bit-ordering notation such that the LSB is bit 0 and the MSB is bit 127, consistent with standard VERILOG® notation.
1: R←{128'b11100001, {120{1'b0}}}
2: Z←0, V←A, X←B
3: for i=0 to 127 do
4: if x[127−i]==1 then
5: Z←Z⊕V
6: endif
7: if v[0]==0 then
8: V←rightshift (V)
9: else
10: V←rightshift (V)⊕R
11: endif
12: end for
13: return Z Consider a multiplication in GF ($2^{128}$) of A [127:0] and B [127:0], with result RES [127:0]. For reduced gate count, we keep the operands and results in the CPU register file and RAM, and work with a smaller set of data sequentially. We can view the 128-bit operands A and B as sets of half words, 16 bits wide, such that
$V_0$=A [15:0], $V_1$=A [31:16], $V_n$=A[16*(n+1)−1:16*n] for n=0 . . . 7.
$X_0$=B[15:0], $X_1$=B[31:16], $X_n$=B[16*(n+1)−1:16*n] for n=0 . . . 7.
The result is:
$Z_0$=RES [15:0] $Z_1$=RES [31:15], $Z_n$=RES[16*(n+1)−1: 16*n] for n=0 . . . 7.

Figure 13:
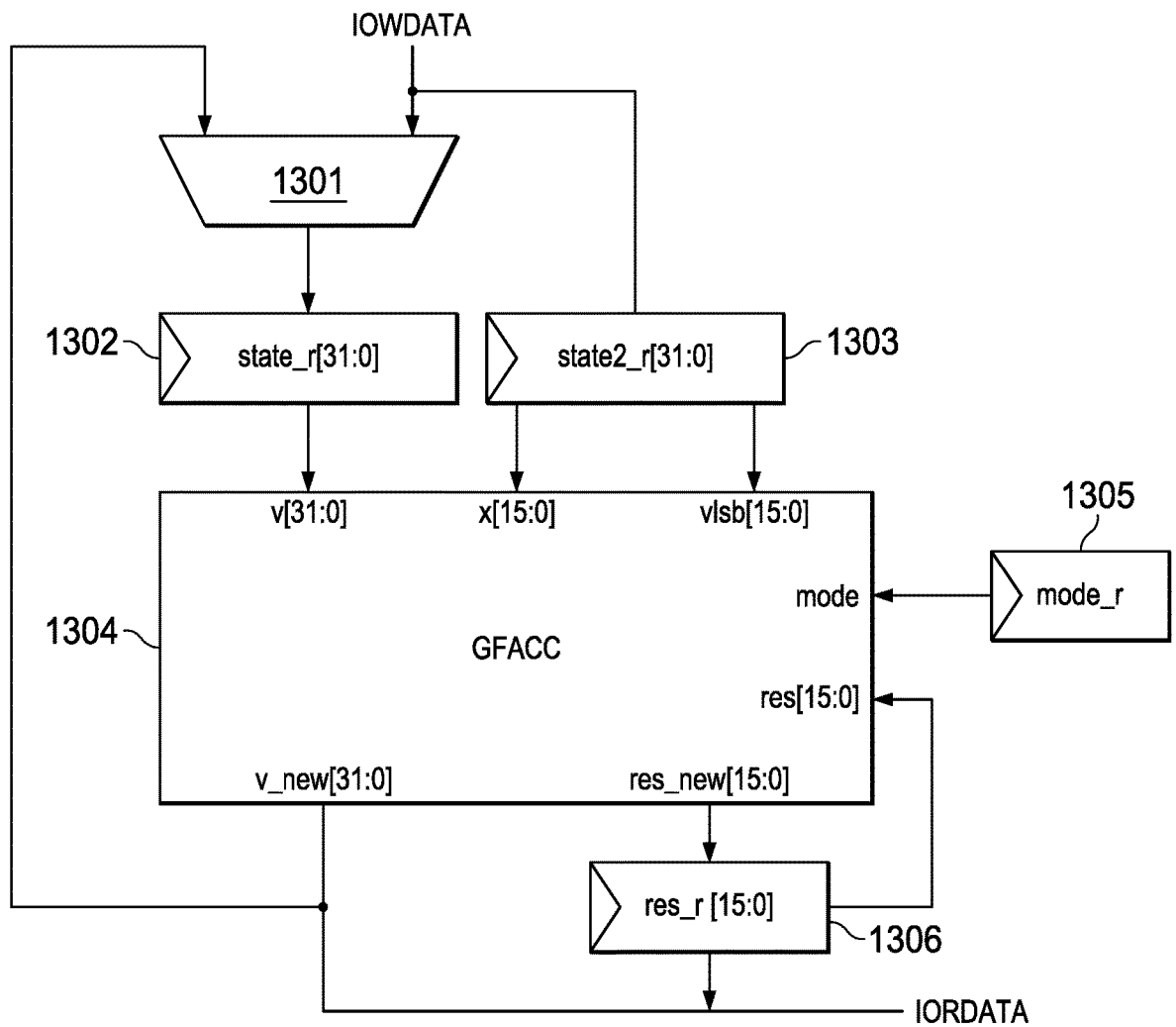
FIG. 13 is a block diagram illustrating a GFACC operation, according to an embodiment.

The core of the CRYA GCM accelerator is an operator, GFACC (FIG. 13), where input v corresponds to two concatenated V half words, $\{V_{n+1}, V_n\}$ from operand A as defined above, and input x correspond to one $X_n$ half word from operand B. GFACC includes multiplexer 1301, state register 1302 (state1_r), state register 1303 (state2_r), GFACC 1304, register 1305 (mode_r) and register 1306 (res_r).

The GFACC operator updates res_new and v_new outputs according to the following pseudo code:

| GFACC Pseudo Code | |
|---|---|
| Mode 1 | Mode 0 |
| For i = 0 to 15 do<br>  if (x[15-i])<br>    res = res xor v<br>    v = rightshift(v)<br>  res_new = res | For i = 0 to 15 do<br>  if (x[15-i])<br>    res = res xor v<br>    v = rightshift(v)<br>  if (vlsb[i])<br>    v = v xor R<br>  v_new = v<br>  res_new = res |

The mode input selects operating mode for the operator. Clearing mode corresponds is referred to "Mode 0," setting mode corresponds to "Mode 1." The GFACC operator will first be described in "Mode 1" configuration. It will then be described in "Mode 0" configuration.

Mode 1—Calculate Partial Results $Z_0$-$Z_6$

Figures 14, 15:
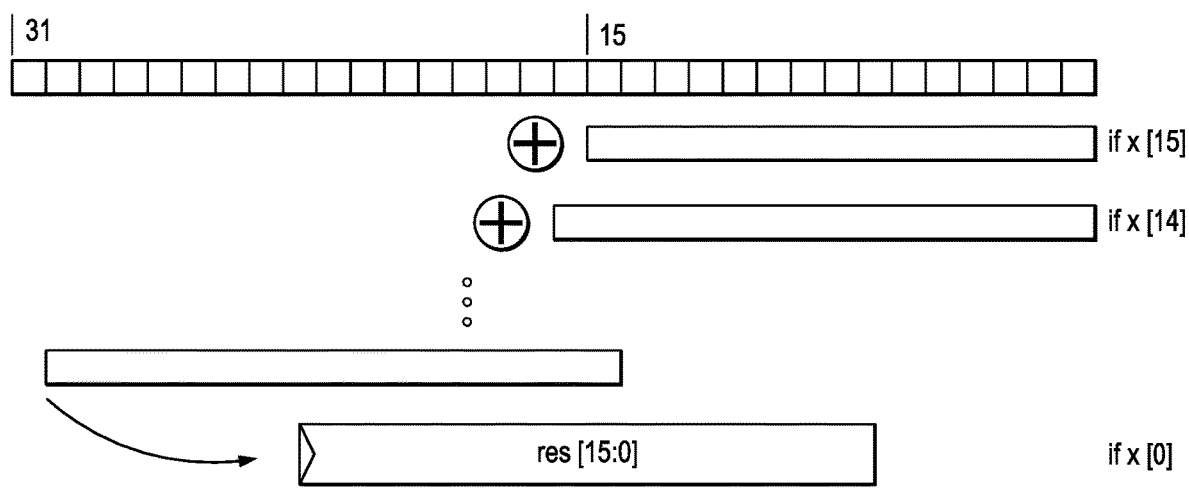
FIG. 14 is a table illustrating GFACC pseudo code, according to an embodiment.
FIG. 15 illustrates a GCM 16-bit XOR multiplication, according to an embodiment.

The 16-bit result register (res_r) corresponds to 16 bits of the final 128-bit result of the GF ($2^{128}$) multiplication, $Z_n$. For every clock cycle, GFACC updates the res_r register with the XOR of the res_r value and 16 shifted versions of v (FIG. 15). This is, in essence, a regular multiplication, except that it is done in finite field arithmetic, so additions are replaced by XOR. The GFACC Mode 1 pseudo code can be compared to the original algorithm (refer to Algorithm 1). While the original algorithm iterates 128 times and shifts and XORs the entire A operand with Z, the GFACC operator iterates only 16 times, doing 16 shifts for every single-cycle operation.

Figure 16:
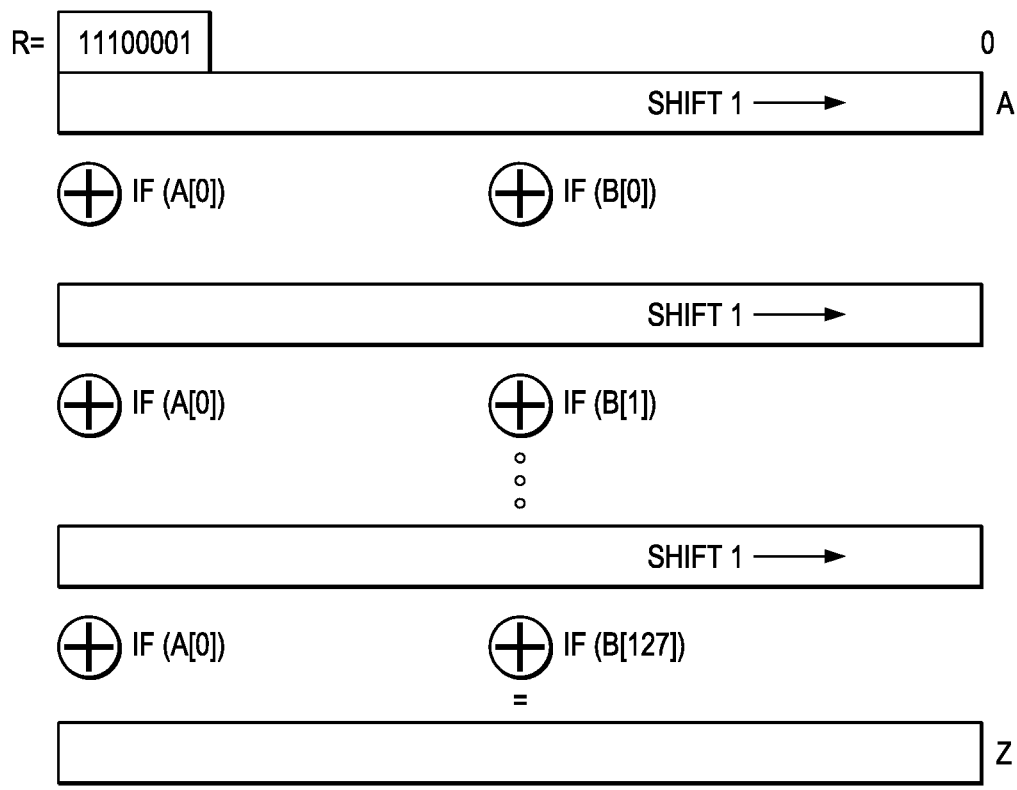
FIG. 16 illustrates GF ($2^{128}$) parallel multiplication, according to an embodiment.
Figure 17:
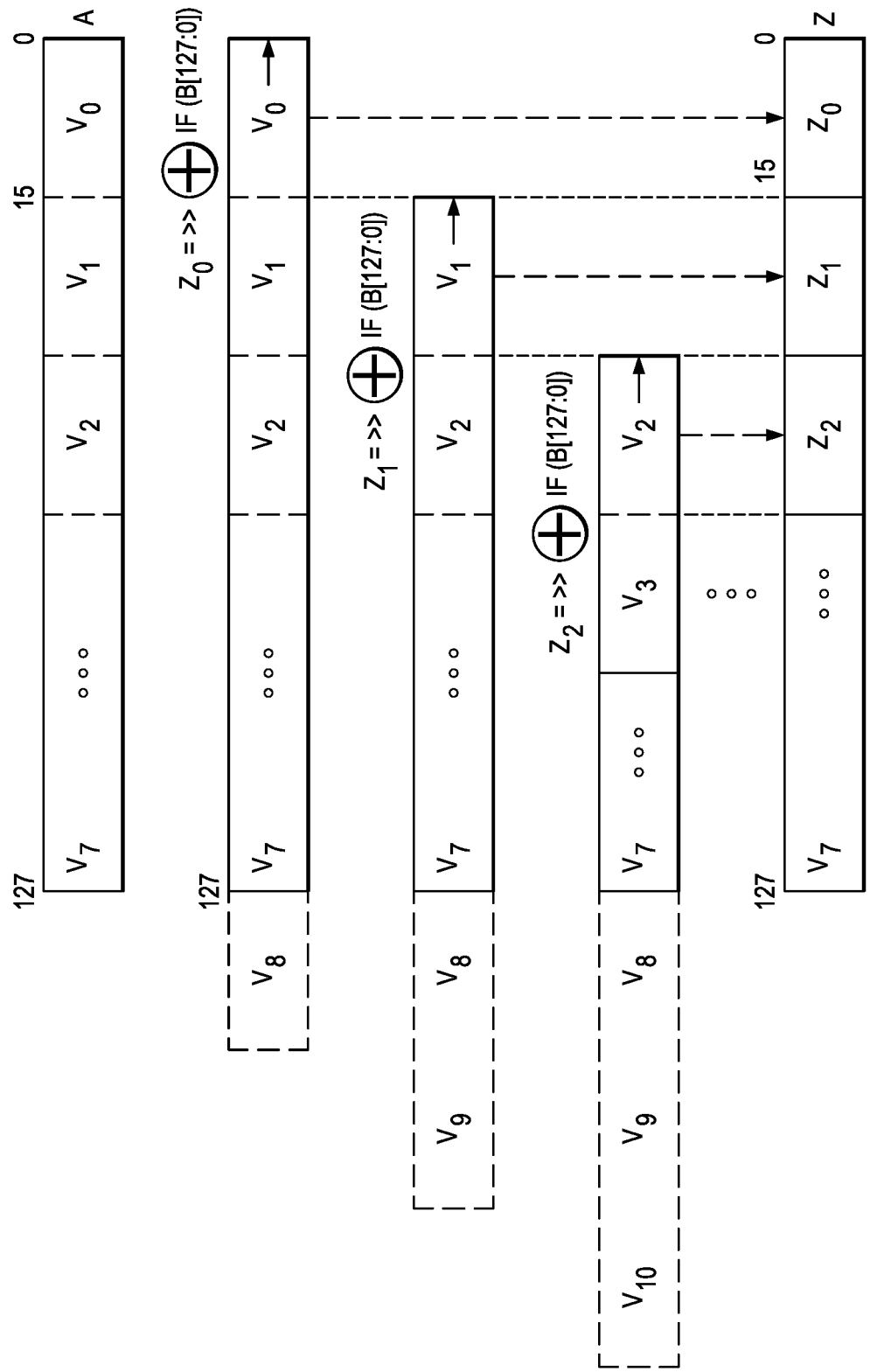
FIG. 17 illustrates GFACC half-word multiplication, according to an embodiment.

The difference between the GFACC method and the original algorithm is illustrated in FIGS. 16 and 17. In FIG. 16, every 16-bit partial $Z_n$ result is a function of the B operand and parts of the A operand starting with $A_n$. The V input of GFACC always needs to be 32 bits, because the shifting pushes 16 new V bits into the lower 16 bits, which are used in the XOR operation. This single-cycle operation needs to be performed eight times with different data to complete the 128 iterations that the algorithm dictates. The res_r is kept between these cycles so it can be seen as a 128-bit shifted multiplication, although it produces only 16 bits of the result. To produce the lowest 16 bits of the result, x [15:0] should contain the most significant half word of operand B ($X_7$). v [31:0] should contain the lowest 32-bit word of operand A ($V_1$, $V_0$). The 16-bit multiplication (shift-and-xor) is performed in the cycle following the x write. This will update res_r with an intermediate result.

Then, new x and v values need to be presented to GFACC. To produce the second intermediate result, it needs $X_6$ and $V_2$, $V_1$. The XOR is performed using the intermediate result in res_r. This is repeated until $X_0$ and $V_8$, $V_7$, has been processed by GFACC, and res_r contains the lowest 16 bits of the results ($Z_0$). $Z_1$ is calculated in the same way, but this time the V input is cycled. Tables 3 and 4 in FIG. 18 show the V and X input for each cycle of $Z_0$ and $Z_1$ calculation. The V inputs of results $Z_2$-$Z_6$ can be found in Table 5 shown in FIG. 19, and $Z_7$ is a special case that will be described later. Since every $Z_0$ calculation uses 8 cycles in the operator, calculating $Z_0$-$Z_6$ uses 8×7=56 cycles in the operator.

Mode 0—V Expansion and $Z_7$

We have described $V_7, \ldots, V_0$ as half word slices of the input operand A, but as can be seen from the Z calculations, V needs to be expanded up to $V_{14}$. This expansion comes from line 10 in the algorithm:

10: V←rightshift (V)⊕R

Figures 20, 21:
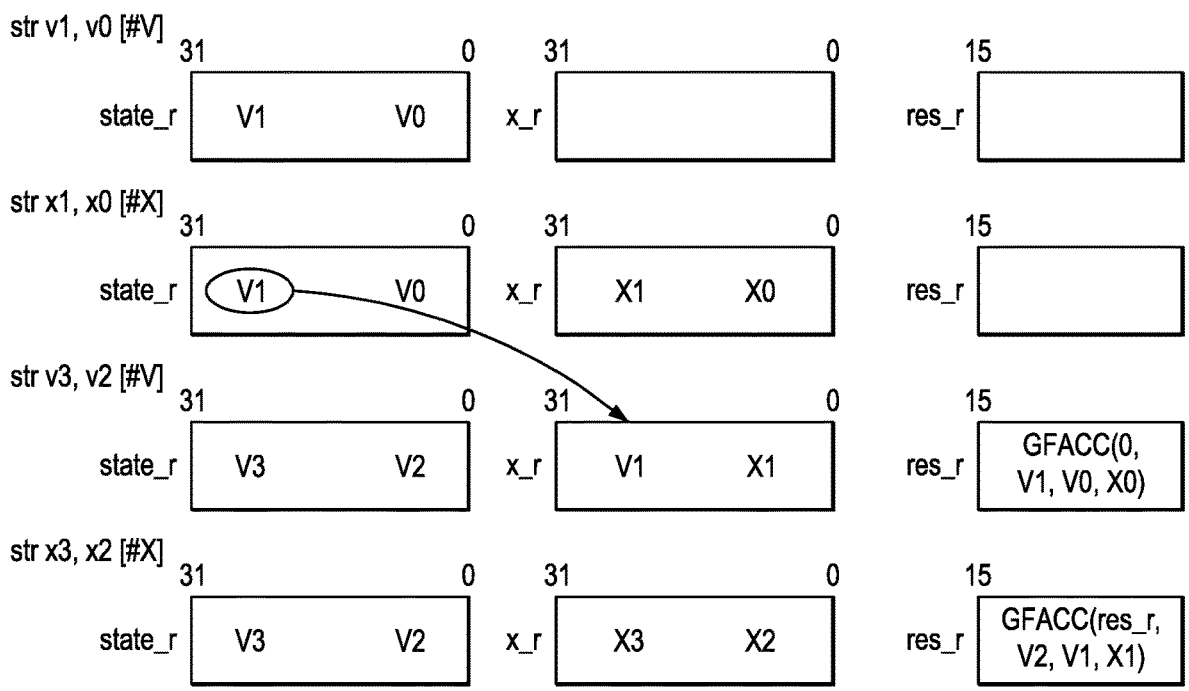
FIG. 20 is a table illustrating a Mode 0 (x and v input), according to an embodiment.
FIG. 21 illustrates GCM data store and internal shift operations, according to an embodiment.

The right shifting is not only pushing 0s into V, the upper bits of V are also XORed with R. Since the algorithm iterates 128 times, 128 new V bits (8 half words) are produced. This corresponds to $V_8$ to $V_{14}$. Also, $V_7$ is updated by the "⊕R" operation. This V expansion is done by the GFACC operator when the mode bit is cleared, "Mode 0" (refer to FIG. 21 and Algorithm 2). Mode 0 is performed in 8 operator cycles. It produces the expanded $V_7, \ldots, V_{14}$ and the uppermost Z bits, $Z_7$. As input, Mode 0 uses $V_7$ as initial data, $V_0$ to $V_6$ in a LSB to MSB order, and $X_7$ to $X_0$ in MSB to LSB order. The v_new output of FIG. 11 is used to feed back the modified V into the operator. The cycle-by-cycle data input of Mode 0 is described in Table 6 shown in FIG. 20.

For each operator cycle, an expanded V needs to be read from CRYA by the CPU. It should be stored in RAM for use in Mode 1. After the 8 operator cycles, $Z_7$ can be read out and stored at the final result destination address. In fact, $Z_7$ cannot be calculated along with $Z_0$-$Z_6$ in the GFACC operator, since it is dependent on the intermediate values of the V expansion "⊕R" operation.

Timing Path Considerations

The CRYA GCM architecture is built on a REG-to-REG path timing model. This means that the res_r and state_r updates (refer to the GFACC block diagram shown in FIG. 21) should be independent of I/O Port signals (IOWDATA, IOADDR). To allow this, the reference implementation includes two command registers, gcm_cmd_r and gcm_cmd2_r. They are set when new data is written to state_r or state2_r, as described in the previous section. The state_r and res_r registers will only be updated when the cmd registers are set and stay high for one cycle. The reason for having two cmd bits is to alternate the data input to the GFACC as described previously.

Example CRYA Software

The CPU (e.g., ARM Grebe CPU) has registers r0 to r12 that are usable (registers r13 to r15 are link, stack pointer and PC.). An additional constraint, which is very important, is that only registers r0-r7 can be used on logic and load/store instructions. Registers r8-12 can only be used with MOV and ADD instructions. This means that registers r0-r7 needs to be used as working registers as well as pointer registers to point to RAM/Flash and peripheral.

Example CRYA Software—AES

AES state is 4x32 bits. In an embodiment, registers r0-r3 are initialized with the input data. After the first ShiftRows (SubBytes(MixCol)) operation, the new state will be in registers r4-r7. r0-r3 are then used as working registers to create the next RoundKey and do the AddRoundKey operation on registers r4-r7. Then, ShiftRows(SubBytes(MixCol)) is done on registers r4-r7 and the new state is back in registers r0-r3. This sequence is looped a number of times.

The following pseudo code illustrates this method.
r0-r3:=inData
LOOP:
r4-r7:=ShiftRows(SubBytes(MixCol(r0-r3)))
r4-r7:=AddRoundKey(r4-r7)
r0-r3:=ShiftRows(SubBytes(MixCol(r4-r7)))
goto LOOP For AES decryption, the ordering of operation is different, and requires a separate software routine.

Example CRYA Software—SHA

For SHA, the Grebe constraint of r0-r7 working registers is still more limiting. The SHA algorithm keeps 8x32 bits working state, and rotates registers for each round in the compression loop:
h:=g
g:=f
f:=e
e:=d+temp1
d:=c
c:=b
b:=a
a:=temp1+temp2

In order to avoid this rotating and save cycles, the CRYA software implementation uses a semi-loop-unrolled approach where the compression loop is repeated 6 times and alternates the input data. In an embodiment, an assembly macro is used and rotates the input arguments:

| SHACOMP_MACRO | r0, r1, r2, r4, r5, r6, r7, r10, r8, r3, r12, r11, r9 |
| --- | --- |
| SHACOMP_MACRO | r6, r0, r1, r2, r4, r5, r7, r11, r8, r3, r12, r10, r9 |
| SHACOMP_MACRO | r5, r6, r0, r1, r2, r4, r7, r10, r8, r3, r12, r11, r9 |
| SHACOMP_MACRO | r4, r5, r6, r0, r1, r2, r7, r11, r8, r3, r12, r10, r9 |
| SHACOMP_MACRO | r2, r4, r5, r6, r0, r1, r7, r10, r8, r3, r12, r11, r9 |
| SHACOMP_MACRO | r1, r2, r4, r5, r6, r0, r7, r11, r8, r3, r12, r10, r9 |

After six rounds, the registers are back in their initial position, and a loop can be used to iterate this the required number of times.

Example CRYA Software—GCM

GCM software consists of two parts—Mode 0 and Mode 1. Mode 0 is only done once but requires more cycles than one iteration of Mode 1. After Mode 0 is performed, $V_{14}, \ldots, V_8$ are in RAM, as well as $Z_7$. Then, Mode 1 is performed in a loop for $Z_0, \ldots, Z_6$. When calculating $Z_0$-$Z_6$, optimal performance is achieved by supplying 32 bits of data for each cycle. For each store on the IOBUS, an updated intermediate, res_r, is produced (one operator cycle). Since each operand (A, B) will be 128 bits of data located sequentially in memory, the fastest way to achieve this is to alternate between storing 32 bits of operand A and storing 32 bits of operand B:
   str r4, [r7, #0x40]//Store V1, V0 to state_r
   str r0, [r7, #0x58]//Store X1, X0 to state2_r
Every V store will place 32-bit V data in state_r, and at the same time copy the upper half of state_r into the upper half of state2_r and shift the upper half of state2_r into the lower half (refer to the memory map in section 2.3—address offset 0x50). This way we can minimize the amount of registers while optimizing performance.

This concept is illustrated in FIG. 16, where the first result is available after the third store operation, using the previous value of state_r [31:0] and state2_r [15:0]. The next cycle alternates data input to GFACC, such that v is {state_r [15:0], state2_r [31:16]}.

To produce $Z_0$, the input data is $V_7, V_6, V_5, V_4, V_3, V_2, V_1, V_0$. (Refer to Table 5.) For $Z_1$, $V_0$ is not used so the input data is $V_8, V_7, V_6, V_5, V_4, V_3, V_2, V_1$. Since every $V_n$ is a 16-bit number, we run into a misalignment issue on every odd $Z_n$. If $V_1, V_0$ is stored at memory location 0x0000 and $V_3, V_2$ is stored at 0x0004, then storing {$V_2, V_1$} requires us to load both memory locations and aligning them in the same register before storing to state_r. To avoid this, part of the misaligned data handling is done in CRYA. Different store operations are defined for different address offsets, so that we can store {$V_1, V_0$} followed by {$V_3, V_2$} and have the resulting state_r as {$V_2, V_1$}. These transformations can be seen in Table 1.

For the case of aligned data ($Z_n$ where n is even) the software code will look like this:
   ldr r4, [r6, #0x00]//Load V
   str r4, [r7, #0x50]//Store V1, V0 to state_r
   str r0, [r7, #0x54]//Store X1, X0 to state2_r
For misaligned data ($Z_n$ where n is odd) the software code will look like this:
   ldm r6!, {r3, r4}
   str r3, [r7, #0x58]//Store V1, V0
   str r4, [r7, #0x5C]//Store V3, V2
   //state_r is now V2, V1
   str r0, [r7, #0x54]//Store X1, X0 to X Because even and odd $Z_n$ must be handled differently, the Mode 1 loop will iterate only 3½ times to calculate result parts $Z_0$ to $Z_6$. The following pseudo code shows the loop structure for Mode 1.
r0-r3:=Operand B
LOOP:
GFACC (V, r0-r3)
ldr GFACC res //Even Z
str GFACC res to mem (Z)
if MEMPOINTER=END
goto END
GFACC ($V_{misaligned}$, r0-r3)
ldr GFACC res //Odd Z
str GFACC res to mem (Z)
goto LOOP While this document contains many specific implementation details, these should not be construed as limitations on the scope of what may be claimed but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can, in some cases, be excised from the combination, and the claimed combination may be directed to a sub combination or variation of a sub combination.

What is claimed is:

1. A system comprising:
a central processing unit (CPU);
memory storing instructions that, when executed by the CPU, cause the CPU to perform operations comprising:
sending cryptographic data to an aliased register of a hardware accelerator, wherein a first address used to send the cryptographic data to the aliased register is indicative of a first operation of a cryptographic process;
receiving, from the hardware accelerator, first transformed cryptographic data obtained responsive to performing a first operation of the cryptographic process on the cryptographic data, the first operation comprising one of a first cryptographic encryption operation or a first cryptographic decryption operation;
sending the cryptographic data to the aliased register of the hardware accelerator, wherein a second address used to send the cryptographic data to the aliased register is indicative of a second operation of the cryptographic process; and
receiving, from the hardware accelerator, second transformed cryptographic data obtained responsive to performing the second operation of the cryptographic process on the cryptographic data, the second operation comprising one of a second cryptographic encryption operation or a second cryptographic decryption operation that are different than the first cryptographic encryption operation and the first cryptographic decryption operation, respectively,
wherein the first operation and the second operation are performed sequentially or are performed in parallel.

2. The system of claim 1, wherein the cryptographic process is from a group of cryptographic processes comprising: Advanced Encryption Standard (AES), Secure Hash Algorithm (SHA) or Galois Counter Mode (GCM).

3. The system of claim 1, wherein the second address indicates the second operation according to an aliased register map.

4. The system of claim 1, wherein state vectors and control flow are contained in the CPU.

5. The system of claim 1, wherein the cryptographic process is Advanced Encryption Standard (AES), and the second operation includes calculating round keys using a key schedule.

6. The system of claim 1, wherein the cryptographic process is Advanced Encryption Standard (AES) and the second operation comprises one of: SubBytes, Inverse SubBytes, ShiftRows, Inverse ShiftRows, MixColumn or Inverse MixColumn operation.

7. The system of claim 1, wherein the cryptographic process is Secure Hash Algorithm (SHA) and the second operation comprises one of: Message Expansion loop or Compression Function loop.

8. The system of claim 1, wherein the cryptographic process is Galois Counter Mode (GCM) and the second operation comprises a finite field multiplication with a 128-bit polynomial.

9. The system of claim 1, wherein sending the cryptographic data to the aliased register of the hardware accelerator further comprises:
initiating a write of the cryptographic data from a CPU register to a state register of the hardware accelerator.

10. The system of claim 9, wherein the second transformed cryptographic data is available at the state register upon completing a write cycle corresponding to the write operation.

11. The system of claim 1, wherein performing the first operation of the cryptographic process on the cryptographic data comprises: performing the first operation of the cryptographic process on a first portion of the cryptographic data.

12. The system of claim 11, wherein performing the second operation of the cryptographic process on the cryptographic data comprises: performing the second operation of the cryptographic process on the first portion of the cryptographic data.

13. The system of claim 11, wherein performing the second operation of the cryptographic process on the cryptographic data comprises: performing the second operation of the cryptographic process on a processed portion of the cryptographic data obtained responsive to performing the first operation of the cryptographic process on the first portion of the cryptographic data.

14. A system comprising:
a central processing unit (CPU);
memory storing instructions that, when executed by the CPU, cause the CPU to perform operations of a cryptographic process on cryptographic data, the operations comprising:
sending a first portion of the cryptographic data to an aliased register of a hardware accelerator using one or more addresses;
receiving, from the hardware accelerator, a first transformed cryptographic data obtained responsive to performing one or more operations of the cryptographic process on the first portion of the cryptographic data;
sending a second portion of the cryptographic data to the aliased register of the hardware accelerator using the one or more addresses; and
receiving, from the hardware accelerator, a second transformed cryptographic data obtained responsive to performing the one or more operations of the cryptographic process on the second portion of the cryptographic data,
wherein the one or more addresses used to send the first and second portions of the cryptographic data to the aliased register indicate the one or more of the operations of the cryptographic process.

* * * * *

UNITED STATES PATENT AND TRADEMARK OFFICE
CERTIFICATE OF CORRECTION

PATENT NO. : 10,783,279 B2  Page 1 of 1
APPLICATION NO. : 15/679134
DATED : September 22, 2020
INVENTOR(S) : Frode Milch Pedersen, Martin Olsson and Arne Aas It is certified that error appears in the above-identified patent and that said Letters Patent is hereby corrected as shown below:

In the Specification

Column 1, Line 28, change "in hardware however," to --in hardware, however,--
Column 10, Line 32, change "the stater read" to --the state_r read--
Column 14, Line 1, change "every $Z_0$ calculation" to --every $Z_n$ calculation--

Signed and Sealed this
Twenty-sixth Day of January, 2021

Drew Hirshfeld
*Performing the Functions and Duties of the*
*Under Secretary of Commerce for Intellectual Property and*
*Director of the United States Patent and Trademark Office*